US011270675B2

(12) United States Patent
Mo et al.

(10) Patent No.: US 11,270,675 B2
(45) Date of Patent: Mar. 8, 2022

(54) BURST IMAGE DATA READING METHOD AND APPARATUS, ELECTRONIC DEVICE, AND READABLE STORAGE MEDIUM

(71) Applicant: ZHEJIANG UNIVIEW TECHNOLOGIES CO., LTD., Binjiang District Hangzhou (CN)

(72) Inventors: Deqian Mo, Binjiang District Hangzhou (CN); Hailong Yang, Binjiang District Hangzhou (CN); Yuguang Yuan, Binjiang District Hangzhou (CN); Wenhui Qin, Binjiang District Hangzhou (CN)

(73) Assignee: ZHEJIANG UNIVIEW TECHNOLOGIES CO., LTD., Zhejiang (CN)

(*) Notice: Subject to any disclaimer, the term of this patent is extended or adjusted under 35 U.S.C. 154(b) by 0 days.

(21) Appl. No.: 16/954,489

(22) PCT Filed: Sep. 10, 2018

(86) PCT No.: PCT/CN2018/104861
§ 371 (c)(1),
(2) Date: Jun. 16, 2020

(87) PCT Pub. No.: WO2019/128306
PCT Pub. Date: Jul. 4, 2019

(65) Prior Publication Data
US 2021/0142767 A1    May 13, 2021

(30) Foreign Application Priority Data
Dec. 29, 2017    (CN) .......................... 201711498273.3

(51) Int. Cl.
*G06T 1/60*    (2006.01)
*G09G 5/393*    (2006.01)
(Continued)

(52) U.S. Cl.
CPC ............... *G09G 5/397* (2013.01); *G06F 1/08* (2013.01); *G06T 1/60* (2013.01); *G09G 3/32* (2013.01);
(Continued)

(58) Field of Classification Search
None
See application file for complete search history.

(56) References Cited

U.S. PATENT DOCUMENTS 5,745,118 A *  4/1998  Alcorn .................... G06T 15/04
                                               345/506
6,411,302 B1    6/2002  Chiraz
(Continued)

FOREIGN PATENT DOCUMENTS

CN    1636239    7/2005
CN    1668092    9/2005
(Continued)

OTHER PUBLICATIONS

Feng, Li, "Design of LED Large Screen Scanning Control System", A Thesis Submitted to Chongqing University in Partial Fulfillment of hte Requirement for the Degree of Master of Engineering, College of Communication Engineering of Chongqing University, Chongqing, CN, Apr. 2010, pp. 1-70.
(Continued)

*Primary Examiner* — Joni Hsu
(74) *Attorney, Agent, or Firm* — Hunton Andrews Kurth LLP

(57) ABSTRACT

Disclosed are an image data reading method and apparatus, an electronic device, and a readable storage medium, relating to the technical field of LED image display. The image data reading method includes: storing image data in each row of image blocks into a number of v storage blocks, where each of the v storage blocks stores a number of h
(Continued)

rows, each row of data including image data stored at a same position of each group in a same row of every image block; and sequentially outputting from each of the v storage blocks by: sequentially reading each row of the image data in a vertical order, and simultaneously outputting the image data stored at the same position.

17 Claims, 9 Drawing Sheets

(51) Int. Cl.
  *G09G 5/395* (2006.01)
  *G09G 5/397* (2006.01)
  *G06F 1/08* (2006.01)
  *G09G 3/32* (2016.01)
  *G09G 5/399* (2006.01)

(52) U.S. Cl.
  CPC ............ *G09G 5/393* (2013.01); *G09G 5/395* (2013.01); *G09G 5/399* (2013.01); *G09G 2310/08* (2013.01); *G09G 2360/122* (2013.01); *G09G 2360/123* (2013.01); *G09G 2360/18* (2013.01)

(56) References Cited

U.S. PATENT DOCUMENTS

| | | | |
|---|---|---|---|
| 6,999,091 B2* | 2/2006 | Saxena | G09G 5/39 345/540 |
| 7,916,572 B1 | 3/2011 | Perry | |
| 2008/0049035 A1* | 2/2008 | Kuroda | G06T 1/60 345/536 |
| 2008/0055328 A1 | 3/2008 | Shin et al. | |
| 2009/0147130 A1 | 6/2009 | Kim | |
| 2016/0218739 A1 | 7/2016 | Lee | |

FOREIGN PATENT DOCUMENTS

| | | |
|---|---|---|
| CN | 101137061 | 3/2008 |
| CN | 101236740 | 8/2008 |
| CN | 101261807 | 9/2008 |
| CN | 101511021 | 8/2009 |
| CN | 102163404 | 8/2011 |
| CN | 104378574 | 2/2015 |
| CN | 105741237 | 7/2016 |
| CN | 106101712 | 11/2016 |
| WO | 2013094259 A1 | 6/2013 |

OTHER PUBLICATIONS

International Search Report dated Nov. 28, 2018 in International Patent Application No. PCT/CN2018/104861, pp. 1-4.
Office Action dated May 8, 2020 in CN Patent Application No. 201711498273.3, pp. 1-5.
European Search Report, European Patent Office, issued to EP Application No. 18894854.1 dated Jul. 22, 2021, 14 pages.

* cited by examiner

Storing image data in each row of image blocks into one of a number of v storage blocks, each of the v storage blocks storing a number of h rows, each of the h rows of data including image data stored at a same position of every group in the same row of every image block — S110

Sequentially performing output from each of the v storage blocks by: sequentially read each row of the image data in a vertical order, and simultaneously outputting the image data stored at the same position — S120

FIG. 1

Receiving an image frame which includes a plurality of image blocks, each of the plurality of image blocks including a number of v rows of image data, each row of the v rows of the image data being divided into a plurality of data arrays, and each of the plurality of data arrays includes a number of h pixel data — S31

For each of the plurality of image blocks comprised in the image frame, writing pixel data at a j-th position of every of the plurality of data arrays in an i-th row of every of the plurality of image blocks into a j-th data array of an i-th storage block, where $1 \le i \le v$, $1 \le j \le h$ — S32

FIG. 3

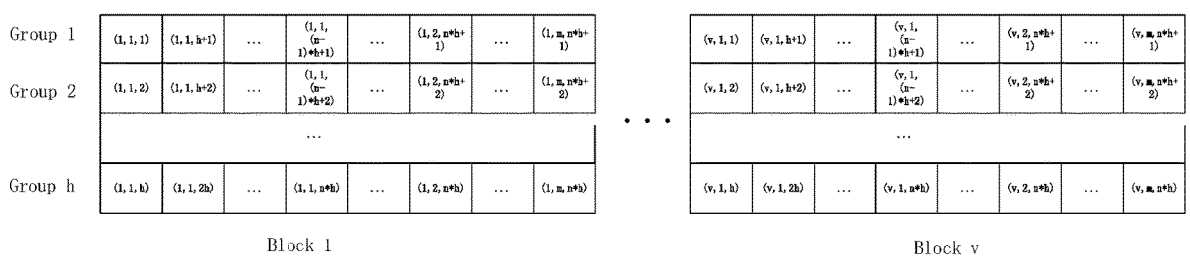

FIG. 4

//BURST IMAGE DATA READING METHOD AND APPARATUS, ELECTRONIC DEVICE, AND READABLE STORAGE MEDIUM

CROSS-REFERENCE TO RELATED APPLICATIONS

This application is a United States national stage application of co-pending International Patent Application Number PCT/CN2018/104861, filed on Sep. 10, 2018, which claims priority to Chinese patent application No. 2017114982733 entitled "IMAGE DATA READING METHOD AND APPARATUS, ELECTRONIC DEVICE, AND READABLE STORAGE MEDIUM" and filed on Dec. 29, 2017 with China National Intellectual Property Administration, disclosures of which are incorporated herein by reference in their entireties.

TECHNICAL FIELD

The present disclosure relates to the technical field of LED image display, and more particularly relates to an image data reading method and apparatus, an electronic device, and a readable storage medium.

BACKGROUND

A small-pitch LED display screen is assembled an indefinite number of boxes, where each box is fully attached with LED lamps. A receiving card inserted in the box controls a row scan chip and an LED driver chip to drive the displaying of the LED lamps, and an image to be displayed on the box is sent to the box's receiving card row by row from a source end sending card. Since the on-chip memory resources of the receiving card's main control chip are limited, the images typically need to be stored in an off-chip memory. When image data is transferred to the LED driver chip, the required image data is read from various parts of the image one at a time, and then together transferred to the LED driver chip. In the related art, the efficiency of reading the off-chip memory is too low, with the amount of image data read each time being too little, making burst read basically impossible. Furthermore, to ensure that the data transmission is not interrupted, typically the read-write clock frequency or the bit width of the external memory are increased, which has a relatively high cost and many restrictions.

SUMMARY

An image data reading method and apparatus, an electronic device and a readable storage medium are provided in the present disclosure.

In a first aspect, an image data reading method is provided in the present disclosure and includes the following operations:

storing image data in each row of image blocks into a number of v storage blocks, wherein each of the v storage blocks stores a number of h rows, each row of the h rows of data comprising image data stored at a same position of every group in the same row of every image block; and sequentially performing output from each of the v storage blocks by:

sequentially reading each row of the image data in a vertical order, and simultaneously outputting the image data stored at the same position.

Optionally, the electronic device includes an off-chip memory configured with the v storage blocks, and each of the v storage blocks is divided into a number of h groups. The operation of "storing image data in each row of image blocks into a number of v storage blocks, wherein each of the v storage blocks stores a number of h rows, each row of the h rows of data comprising image data stored at a same position of every group in the same row of every image block" includes the following operations:

receiving an image frame, which comprises a plurality of image blocks, each of the plurality of image blocks comprising a number of v rows of image data, each row of the v rows of image data being divided into a plurality of data arrays, each of the plurality of data arrays comprising a number of h pixel data; and for each of the plurality of image blocks comprised in the image frame, writing pixel data at a j-th position of every of the plurality of data arrays in an i-th row of every of the plurality of image blocks into a j-th data array of an i-th storage space, wherein $1 \leq i \leq v$, $1 \leq j \leq h$.

Optionally, the electronic device includes a plurality of LED lamps arranged in an array, where the plurality of LED lamps are configured to display the received image frame under the driving of N LED driver chips, and each of N LED driver chips is capable of driving v rows and h columns of LED lamps.

The image frame includes a number of M image blocks, each row of image data in each of the M image blocks is divided into a number of N data arrays, where each color channel of pixels in the image frame has a number of B data bits, and a space size of each of the N data arrays reaches at least M*N*3B bits.

Optionally, the electronic device includes an on-chip memory provided with a buffer. The operation of "for each of the plurality of image blocks included in the image frame, writing pixel data at a j-th position of each of the plurality of data arrays in an i-th row of every of the M image blocks into a j-th data array of an i-th storage block" includes the following operations: obtaining an i-th row of image data of the image frame in the order from top to bottom, and storing the obtained i-th row of image data into the buffer; and for the plurality of data arrays of the i-th image data, sequentially reading the pixel data at a j-th position of every of the N data arrays to obtain a number of N pixel data, and writing the N pixel data into the j-th data array of the i-th storage block.

Optionally, the electronic device is provided with an clock counter RCnt and a data channel counter GRPCnt. The operations of "for the plurality of data arrays of the i-th row of image data, sequentially reading the pixel data at a j-th position of every of the N data array to obtain a number of N pixel data, and writing the N pixel data into the j-th data array of the i-th storage block" includes the following operations:

in response to starting to read the i-th row of image data from the buffer, resetting the clock counter RCnt and the data channel counter GRPCnt;

cyclically counting the clock counter RCnt, and reading pixel data of a (GRPCnt+1)-th position in a (RCnt+1)-th data array of the i-th row of image data at each count; and in response to a value of the clock counter RCnt reaching (N−1), counting the data channel counter GRPCnt, and writing the number of N pixel data that is currently read into a (GRPCnt+1)th group of the i-th storage block in a burst mode.

Optionally, the electronic device assigns a corresponding storage interval Inter for each of the h groups, and a size of the storage interval Inter is at least greater than the capacity of one data array.

The operation of "for the each of the plurality of image blocks included in the image frame, writing the pixel data at a j-th position of every of the plurality of data arrays in an i-th row of every of the plurality of image blocks into a j-th data array of an i-th storage block" Further includes the following operations:

in response to the value of the clock counter RCnt reaches (N−1), and a value of the data channel counter GRPCnt reaching (Inter−1), determining that reading of the i-th row of image data is completed, and starting to read a next row of image data of the image frame from the buffer.

Optionally, the on-chip memory is provided with two buffers. The operation of "sequentially obtaining an i-th row of image data of the image frame in the order from top to bottom, and storing the obtained i-th row of image data into the buffer" includes the following operations:

storing the obtained each row of the image data alternately into the two buffers.

Optionally, the operation of "sequentially reading the each row of image data in a vertical order, and simultaneously outputting the image data at the same position" includes the following operations:

after writing the image frame into the off-chip memory, sequentially reading each row of image data in the vertical order and simultaneously outputting the image data at the same position.

Optionally, the operation of "sequentially reading each row of image data in a vertical order, and simultaneously outputting the image data at the same position" includes the following operations:

sequentially reading the image data of the image frame stored in each of the v storage blocks by a serial number of each of the v storage blocks in a burst mode, wherein for each of the v storage blocks, reading pixel data in each of the N data arrays in reverse order according to a serial number of each of the N data arrays.

Optionally, the image data reading method is applied to a box divided into a number of M image blocks, where the M image blocks is arranged into a number of N rows, each of the M image blocks including a number of v rows of image data, each row of the v rows of image data is divided into a number of n groups, and each of n groups including a number of h image data. The operation of "storing image data in each row of image blocks into a number of v storage blocks, wherein each of the v storage blocks stores a number of h rows, each row of the h rows of data comprising image data stored at a same position of every group in the same row of every image block" includes the following operations:

storing image data in each row of image blocks by:
sequentially extracting in order from left to right an i-th image data of each of n groups from a j-th row of image data stored in a buffer, thus generating a number of h image groups, and sequentially arranging the h image groups in a vertical order according to the order they are generated to obtain a j-th arrangement group, and storing the j-th arrangement group in a j-th storage block, wherein each of the h image groups comprises a number of M*n/N image data, $1 \leq j \leq v$, $1 \leq i \leq h$; and wherein an off-chip memory comprises a number of v storage blocks, each of the v storage blocks comprising h rows, and wherein in each of the v storage blocks, a j-th arrangement group corresponding to a j-th row of image data of a k-th row image block is adjacent to a j-th arrangement group corresponding to a j-th row of image data of a (k+1)-th row of image block, where $1 \leq k \leq (N-1)$.

Optionally, the method further includes the following operation: reading the image data from a source end through two rows of the buffers in an on-chip memory in a ping-pong mode, and writing the image data into the storage blocks of the off-chip memory.

Optionally, the operation of "reading the image data from a source end through two rows of the buffers in an on-chip memory in a ping-pong mode, and writing the image data into the storage blocks of the off-chip memory" includes the following operation:

storing image data in each row of the image blocks by:
reading an f-th row of image data in an e-th row of the M image blocks, and storing the f-th row of image data in an a-th row of the buffers in of the order from left to right; and storing the f-th row of image data stored in a b-th row of the buffers into the v storage blocks, where $1 \leq e \leq N$, $1 \leq f \leq v$, and a=1, b=2 or a=2, b=1.

Optionally, each of the h image groups has a preset spatial capacity, which is calculated according to the following formula:

$$P \geq m*3*n*B \text{(bit)};$$

where P is the preset spatial capacity, m is the number of the image blocks into which the box is divided, and n is a number of driver chips used for each color channel in each of the m image blocks.

Optionally, each of the buffers includes at least one storage interval, which is calculated according to the following formula:

$$\text{Inter}=2^i \geq h;$$

where Inter is the storage interval, i is a minimum value that makes Inter greater than or equal to h, and h is a number of image data included in each of the h image groups.

Optionally, the operation of "reading an f-th row of image data in an e-th row of the M image blocks, and storing the f-th row of image data in an a-th row of the buffers in of the order from left to right" includes the following operations:

reading a g-th group of image data in the f-th row of the e-th row of the image blocks; and
when the storage interval is not equal to 2i, striding a starting address of the (g+1)-th group of image data over a number of 2i-h image data addresses, and then storing into an a-th row of the buffers, wherein $1 \leq g \leq n-1$.

In a second aspect, an image data reading apparatus is further provided in the present disclosure and includes a storage unit and a reading unit. The storage unit is configured to store image data in each row of image blocks into a number of v storage blocks, where each of the v storage blocks stores a number of h rows, each row of data including image data stored at a same position of every group in the same row of every image block.

The reading unit is configured to sequentially perform output from each of the v storage blocks by: sequentially reading each row of the image data in a vertical order, and simultaneously outputting the image data stored at the same position.

Optionally, the electronic device is provided with an off-chip memory configured with the v storage blocks, and each of the v storage blocks is divided into a number of h groups. The storage unit is configured to receive an image frame, which includes a plurality of image blocks, each of the plurality of image blocks including a number of v rows of image data, each row of the v rows of image data being divided into a plurality of data arrays, each of the plurality of data arrays including a number of h pixel data; and for each of the plurality of image blocks includes in the image frame, write pixel data at a j-th position of every of the plurality of data arrays in an i-th row of every of the plurality of image blocks into a j-th data array of an i-th storage space, where 1≤i≤v, 1≤j≤h.

Optionally, the electronic device includes a plurality of LED lamps arranged in an array, where the plurality of LED lamps are configured to display the received image frame under the driving of N LED driver chips, and each of N LED driver chips is capable of driving v rows and h columns of LED lamps.

The image frame includes a number of M image blocks, each row of image data in each of M image blocks being divided into a number of N data arrays, where each color channel of pixels in the image frame has a number of B data bits, and a space size of each of the N data arrays reaches at least M*N*3B bits.

In a third aspect, an electronic device is provided in the present disclosure and includes a readable storage medium, a processor and an image data reading the apparatus. The apparatus includes a storage unit and a reading unit.

The storage unit is configured to store image data in each row of image blocks into a number of v storage blocks, wherein each of the v storage blocks stores a number of h rows, each row of data comprising image data stored at a same position of every group in the same row of every image block.

The reading unit is configured to sequentially perform output from each of v storage blocks by: sequentially reading each row of image data in a vertical order, and simultaneously outputting the image data stored at the same position in the following manner.

In a fourth aspect, a readable storage medium is provided in the present disclosure and stores computer programs, where when the computer programs are executed, the image data reading method of any one of claims 1 to 7 is performed.

Other features and advantages of the present disclosure will be elaborated hereinafter in the description and, moreover, partially become apparent from the description, or will be understood through implementation of the present disclosure. The object and other advantages of the present disclosure may be implemented and obtained through structures set forth in the description, claims and drawings.

The object, features and advantages of the present disclosure will be more apparent from the detailed description of the present disclosure in conjunction with the drawings.

BRIEF DESCRIPTION OF DRAWINGS

To illustrate the technical solutions in specific embodiments of the present disclosure or the technical solutions in the related art more clearly, drawings used in the description of the specific embodiments or the related art will be briefly described below. Apparently, the drawings described below illustrate part of the embodiments of the present disclosure, and those skilled in the art may obtain other drawings based on the drawings described below without paying creative efforts.

FIG. 1 is a flowchart of an image data reading method according to the present disclosure;

FIG. 3 is another flowchart of an image data reading method according to the present disclosure;

FIG. 4 is a schematic diagram illustrating the configuration of space of an off-chip memory according to the present disclosure;

REFERENCE SIGNS

Figure 2:
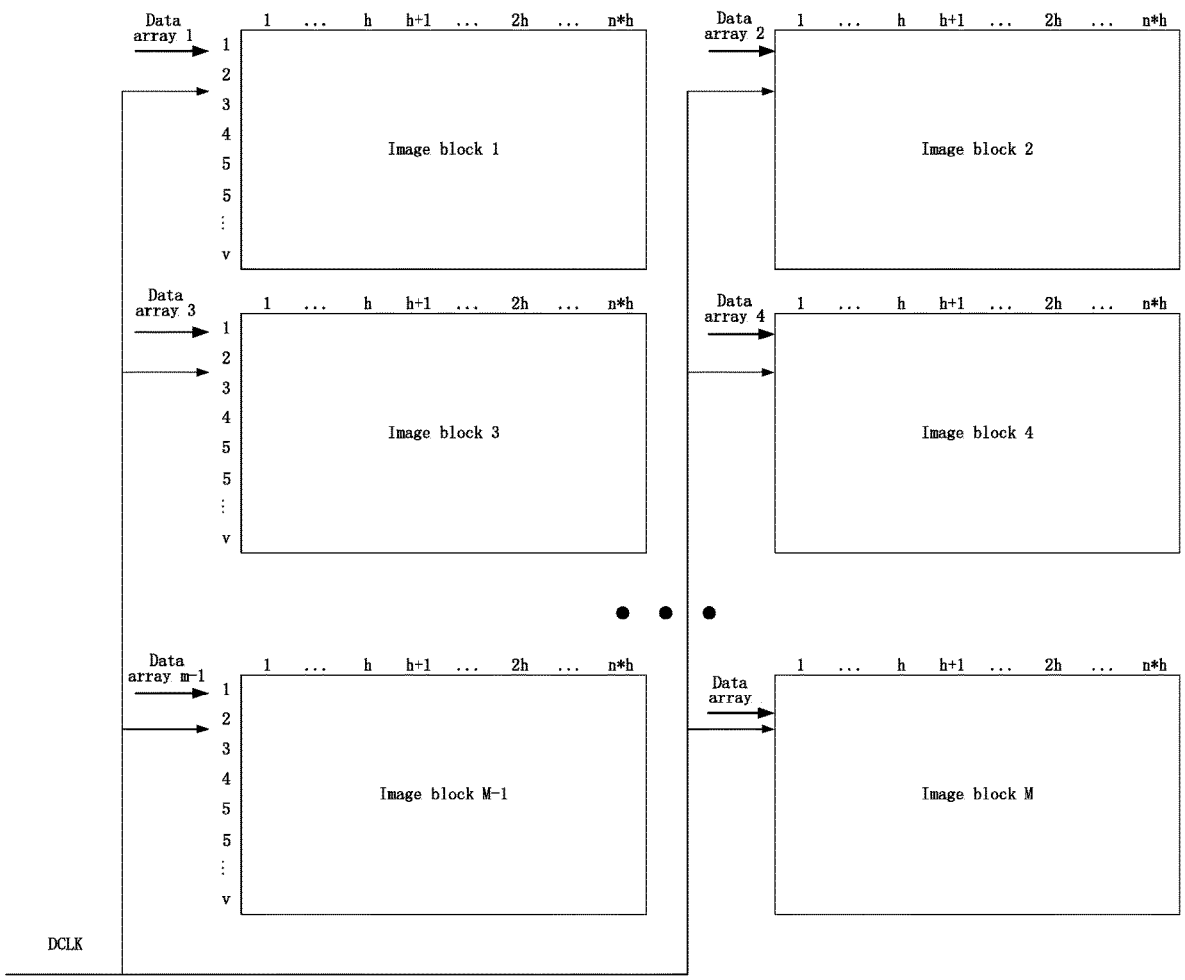
FIG. 2 is a schematic block diagram of a box according to an embodiment of the present disclosure.

100—Electrical device
110—Readable storage medium
120—Processor
200—Image data reading apparatus
210—Storage unit
220—Reading unit

DETAILED DESCRIPTION

To illustrate the purposes, technical solutions and advantages of the present disclosure more clearly, the technical solution of the present disclosure will be described clearly and completely in conjunction with drawings. Apparently, the embodiments described below are part, not all, of embodiments of the present disclosure. Based on the embodiments described herein, all other embodiments obtained by those skilled in the art without creative work are within the scope of the present disclosure.

The number of LED lamps that can be controlled by a current LED driver chip is limited, and one LED driver chip typically merely controls V row and H column of LED lamps, where H is the largest data channel of the LED driver chip, and thus the LED lamps of the entire box needs to be illuminated by the cascading of a plurality of LED driver chips. In a vertical direction, the box is divided into K aliquots, where the number of rows of each part is v, and v is the row scan number of LED driver chips. When the LED lamps are illumined, the same row of the K aliquots is connected at the same time. The same row of K aliquots means that an N-th row of K aliquots is connected at the same time, and a value range of N is 1 to V. For example, a first row of K aliquots is connected at the same time, a second row of K aliquots is connected at the same time, third row of K aliquots is connected at the same time, and so on. Based on this, the LED driver chip needs to light k rows of LED lamps at the same time, and a receiving card needs to send data of the same row to the LED driver chip synchronously. In a horizontal direction, it is impossible to cascade too many chips in the horizontal direction due to the limitation of a data clock of the LED driver chip.

It is assumed that a cycle of the data clock DCLK of the LED driver chip is T, the number of data bits of per color channel of per pixel is B (usually 16 bit). The LED driver chip receives the data in serial mode, then the total time (i.e. pixel cycle) for sending one pixel is t1=B*T.

The time for a main control chip to read a number of m image data to be sent of m image blocks is t2;

Furthermore, to ensure that the data transmission is uninterrupted, t2 should be less than t1. To satisfy t2<t1, possible methods are described below.

(1) The DCLK is reduced, and t1 is increased. The lower limit of DCLK is to ensure that an image can be transmitted in one frame time, so DCLK cannot be lowered infinitely.

(2) t2 is reduced, the read-write clock frequency of an external memory is increased or the bit width is increased, but this method will increase the cost of the external memory and a main controller. The other is to find ways to improve the reading efficiency of external memory.

As the resolution of the box increases, the more pixel points there are, the smaller the cycle of DCLK needs to be set, and the smaller T1 will be. Considering the performance requirements of LED chips and the requirements of single board Electro Magnetic Compatibility (EMC), DCLK has an upper limit, the number of cascaded chips has an upper limit, and the size of each image block in the box also has an upper limit. In this instance, in order to improve the resolution of the case LED, merely the number of image blocks and the number of data arrays can be increased, that is, the above-mentioned m can be increased. However, the reading efficiency of the image data of the external memory is too low, so that the t2 is too large, thus the number of image blocks and the number of data arrays are limited, and the maximum number of data arrays that the receiving card can support and the resolution size of the box to a certain extent are also limited.

Based on this, the present disclosure provides an image data reading method and apparatus, an electronic device and a readable storage medium to shorten the reading time of image data in an off-chip memory by an LED driver chip on the basis of not changing the hardware read-write clock frequency or increasing the bit width in a burst read mode.

In order to facilitate understanding of the present embodiment, the image data reading method provided in the present disclosure is first described in detail.

For the above-mentioned box is divided into K aliquots in the vertical direction, the box is divided into L aliquots in the horizontal direction to obtain K*L image display regions, and marks 1, 2, 3, . . . , m are sequentially added to the K*L image display regions. Correspondingly, the image frame displayed on the box also includes K*L image blocks, each of the K*L image blocks corresponds to a respective one of the K*L image display regions, and the K*L image blocks are also marked as 1, 2, 3, . . . , m, respectively. As illustrated in FIG. 2, it is a scenario schematic of 2 folds in the horizontal direction and m/2 folds in the vertical direction for the box. Correspondingly, for the image frame displayed in the box, the image frame includes two image blocks in the horizontal direction and m/2 image blocks in the vertical direction. v and h are the number of row scans and the number of data channels configured by each LED driver chip, respectively, and n is the number of cascades of LED driver chips in the horizontal direction.

In the above-mentioned scenario, one image frame is divided into m image blocks, and m data arrays are required. Same position image data of each image block needs to be sent simultaneously, where the same position refers to the same position in both horizontal and vertical directions. For example, the each image block may be equally divided in the horizontal direction, and it is assumed that n image groups are obtained by equally dividing at a length of h. In the horizontal direction, 1~h is a first image group, (h+1)~2h is a second image group, and so on, [(n−2)*h+1]~(n−1)*h is a (n−1)-th image group, and [(n−1)*h+1]~n*h is an n-th image group.

In the existing solution, for each of the m image blocks, it is necessary to sequentially read the image data from a rightmost side to a leftmost side. For example, for the each image block, firstly, data of the rightmost position, i.e., the n*h position, in an n-th image group is read, and then data of the (n−1)*h position in a (n−1)-th image group is read until data of the h position in a first image group is read; secondly, returning to the rightmost side, data of the n*h−1 position in the n-th image group is read until data of the h−1 position in the first image group is read; and so on until the data at 1 position in the first image group is read.

It can be seen from this that in this solution, data need to be read and transmitted one by one, so that the efficiency is low and the reading time is long, and the above problems can be improved by adopting a burst image data reading method of the present disclosure.

Referring to FIG. 1, FIG. 1 is a flowchart illustrating an image data reading method according to the present disclosure. The image data reading method illustrated in FIG. 1 may be applied to an electronic device, and the electronic device may be any device having an image processing function. As illustrated in FIG. 1, the image data reading method includes steps described below.

In step S110, image data in each row of image blocks is stored into a number of v storage blocks, where each of the v storage blocks stores a number of h rows, and each row of data including image data at a same position of every group in the same row of every image block.

In step S120, output from the each of v storage blocks is sequentially performed in the following manner.

Each row of image data is sequentially read in a vertical order, and the image data at the same position is outputted simultaneously.

In the present disclosure, the electronic device may include an on-chip memory and an off-chip memory. In view of the limited storage space of the on-chip memory, the each row of image data in the received image frame may be first acquired through a buffer of the on-chip memory, and the image data is arranged in a specific manner; and then the image data is stored in a storage block provided on the off-chip memory, and when data is read and output in the storage block, discrete image data points on the box may be bursty read, the reading time of the LED driver chip to the image data in the off-chip memory is shortened, and the receiving card that can be supported the box with multiple data arrays and large resolution is achieved at lower cost.

In the present disclosure, the step S110 may have different implementations. In a specific embodiment, in a case where the electronic device includes a plurality of LED lamps arranged in an array, where the plurality of LED lamps are configured to display the received image frame under the driving of N LED driver chips, and each of N LED driver chips is capable of driving v rows and h columns of LED lamps, the off-chip memory may open up with the v storage blocks, where each storage block is divided into a number of h groups, and each group is continuous address space on the off-chip memory. The electronic device sets the order for the v storage blocks and h groups in each storage block, which can be achieved by setting numbers.

In this instance, the step S110, as illustrated in FIG. 3, may include sub-steps described below.

In step S31, an image frame is received, where the image frame includes a plurality of image blocks, each of the plurality of image blocks includes v rows of image data, each row of the v rows of the image data is divided into a plurality of data arrays, and each of the plurality of data arrays includes a number of h pixel data.

In step S32, for each of the plurality of image blocks included in the image frame, pixel data at a j-th position of every of the plurality of data arrays in an i-th row of the each of the plurality of image blocks is written into a j-th data array of an i-th storage space, where $1\leq i\leq v$, $1\leq j\leq h$.

The image frame may include M image blocks, each row of image data in each of M image blocks is divided into N data arrays, the number of data bits in each color channel of pixels in the image frame is B, and space size of each of the N data arrays reaches at least M*N*3B bits.

Optionally, the step S32 may be implemented in sub-steps described below.

An i-th row of image data of the image frame is acquired in order from top to bottom, and the acquired i-th row of image data is stored in the buffer.

For the plurality of data arrays of the i-th image data, a j-th position of pixel data of the every of the N data arrays is sequentially read to obtain a number of N pixel data, which are written into the j-th data array of the i-th storage block.

Optionally, in the present disclosure, the electronic device may be configured with a clock counter RCnt and a data channel counter GRPCnt. In this instance, the step in which for each data array of the i-th image data, a j-th position of pixel data of the each data array is sequentially read to obtain N pixel data, and the N pixel data are written into the j-th data array of the i-th storage block, may be implemented in sub-steps described below.

When the i-th row of image data is started to read from the buffer, the clock counter RCnt and the data channel counter GRPCnt are reset.

Cyclical count is performed on the clock counter RCnt, and pixel data of a (GRPCnt+1)-th position in an (RCnt+1)-th data array of the i-th row of image data at each count is read.

When a value of the clock counter RCnt reaches (N−1), the data channel counter GRPCnt is counted, and the currently read N pixel data is written into a (GRPCnt+1)-th group of the i-th storage block in a burst mode.

Optionally, the electronic device may assign a corresponding storage interval Inter for each group in the storage block, where the storage interval Inter is capable of storing the pixels of at least one data array, i.e., Inter is greater than or equal to h. In detail, in the present disclosure, Inter=$2^i\geq h$, where i may take the minimum value that makes Inter greater than or equal to h. In this instance, each storage interval stores a number of h pixels.

Accordingly, the step 32 may further include sub-steps described below.

When the value of the clock counter RCnt reaches (N−1), and a value of the data channel counter GRPCnt reaches (Inter−1), it is determined that reading of the i-th row of image data is completed, and a next row of image data of the image frame is started to read from the buffer.

In addition, the electronic device may further be configured with a row scan counter BLKCnt, an initial value of the BLKCnt is 1 in the present disclosure, and a value of the BLKCnt is accumulated by 1 every time the GRPCnt=Inter−1, and the value of the BLKCnt is set to 1 when the value of the BLKCnt reaches v. In other words, in a case where the processing of each image frame is started, for example, the image data of the image frame is started to be stored in the buffer, the value of the BLKCnt is set to 1, and in a case where the image frame is written into the off-chip memory, the value of the BLKCnt reaches v.

In the present disclosure, the step S120 may include sub-steps described below. After the image frame is written into the off-chip memory, the operation of sequentially reading each row of image data in a vertical order and simultaneously outputting the image data at the same position.

In detail, sequentially reading the each row of image data in a vertical order and simultaneously outputting the image data at the same position may be implemented in sub-steps described below.

The image data of the image frame stored in each of the v storage blocks is sequentially read according to the serial number of the each of the v storage blocks in the burst mode, where, for the each of the v storage blocks, pixel data in the each of the plurality of data arrays is read in reverse order according to the serial number of the each of the plurality of data arrays.

Optionally, in another specific embodiment, the above method embodiment may be applied to a box divided into M image blocks, where the M image blocks are arranged into N rows, each of the M image blocks includes v rows of image data, each row of the v rows of image data is divided into n groups, and each of n groups includes h image data. According to the embodiment of the image data reading method described above, the step S110 may be implemented in the following manner and includes steps described below.

In step S201, storing image data in each row of the image blocks may be implemented in the following manner.

i-th image data of the each group of n groups is sequentially extracted from a j-th row of image data stored in a buffer in order from left to right, and h image groups are correspondingly generated, where the h image groups are sequentially arranged in a vertical order according to the generated sequential order to obtain a j-th arrangement group, and the j-th arrangement group is stored in a j-th storage block, where each of the h image groups includes M*n/N image data, $1\leq j\leq v$, $1\leq i\leq h$.

Where an off-chip memory includes the v storage blocks, and the each of the v storage blocks includes h rows; and in the each of the v storage blocks, the j-th arrangement group corresponding to a j-th row of image data of a k-th row of the N rows of the M image blocks is adjacent to the j-th arrangement group corresponding to a j-th row of image data of a (k+1)-th row of the N rows of the M image blocks, where $1\leq k\leq(N-1)$.

Figure 7:
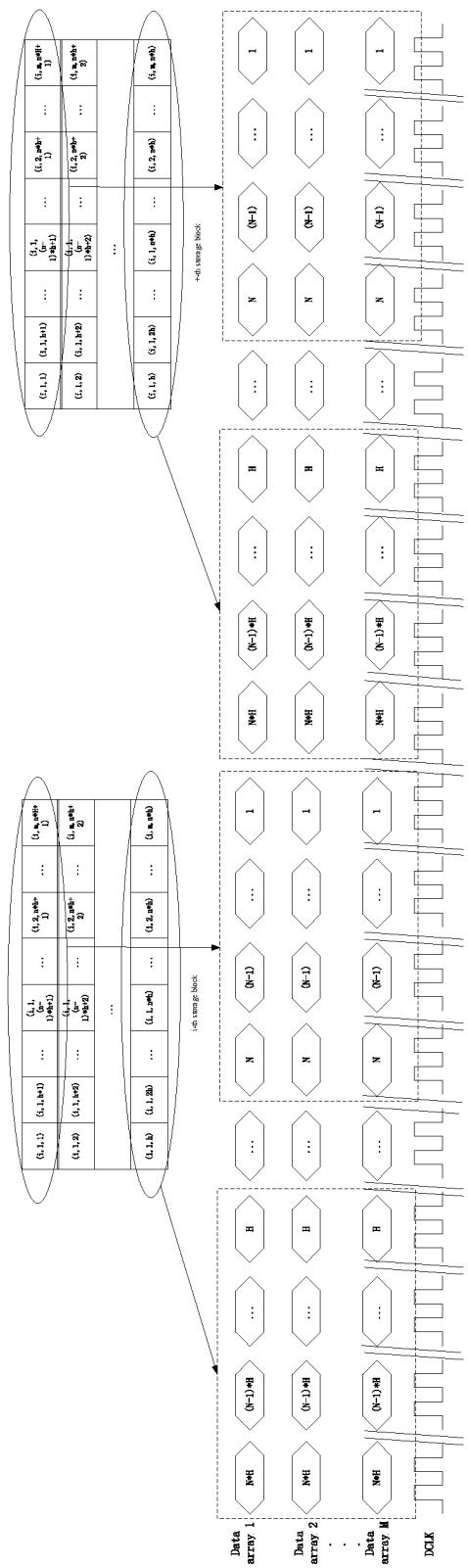
FIG. 7 is a schematic diagram illustrating the storage steps in an image data reading method according to the present disclosure.

Specifically, referring to FIG. 7, first, a first image data is extracted from each group in a first row of image data stored in a buffer to form a first image group, at this time, the image group includes the first image data of each of 2n groups, that is, the image group includes 2n image data. Similarly, the remaining image data of second to h-th are selected to form image groups of the second to the h-th, respectively. Then the h image groups are arranged in a vertical direction according to the generated sequential order to obtain a first arrangement group corresponding to the first row of image data, and the first arrangement group is stored in a first storage block. At this time, the first row of image data in the first row of image blocks of the box has been stored in the storage block. The second row of image data in the first row of image blocks is generated a second arrangement group, and the second arrangement group is stored in a second storage block, the first row image block into the v storage blocks according to the process described above, and so on, until the v rows of image data in the first row of image blocks are respectively stored in the v storage blocks, then the second row of image blocks is subjected to the above storage flow, until all the image data in the n rows of image blocks are stored in the v storage blocks, and the image data in the v storage blocks are outputted.

Figure 8:
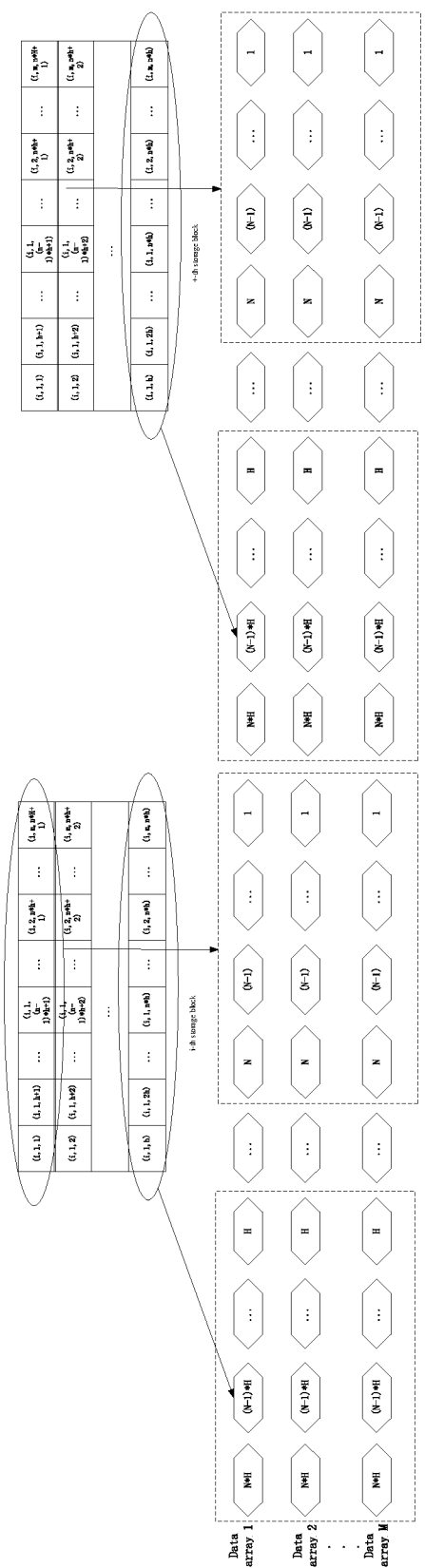
FIG. 8 is a schematic diagram illustrating the reading steps in an image data reading method according to the present disclosure.

Here, output from the each of v storage blocks is sequentially implemented in the following manner, sequentially reading the each row of the image data in a vertical order, and simultaneously outputting the image data at the same position.

Where until a frame of image is written, that is, all image data in all image blocks of the box are stored in the storage blocks, image output is suddenly read from the h-th row of the first storage block, and after the h-th row is read, and h−1 row is read until the current storage block is read. Then an address jumps to a starting address of the h-th row of the second storage block until all storage blocks are read in sequence, as illustrated in FIG. 8.

Optionally, in a case where all N rows of image blocks are written, arrangement groups formed by each row of image blocks is adjacent to the left and right, that is, the first arrangement group is on the left or right side of the second arrangement group. At this time, one row of the entire storage block has N*M*n/N image data, that is, M*n image data, are present.

Here, the M*n image data in the h-th row of the first storage block read the image data at the same position in the corresponding image block on the box in order from right to left. For example, M pieces of n*h image data are outputted in M data arrays simultaneously, then M pieces of (n−1)*h image data are outputted simultaneously until M pieces of h image data are outputted simultaneously, and then M pieces of n*(h−1) image data are outputted to M pieces of h−1 image data, and so on, i.e. image data at the same position of n groups in M image blocks are outputted simultaneously.

Burst reading and burst output of discrete image data that are not connected with each other in a box image block are achieved through the above arrangement of image data in the storage block and an output form of image data in the storage block.

It is to be noted that M image data in the M data arrays are outputted through one pixel cycle, i.e. the M*n image data of the h-th row are outputted via through N pixel cycles, and then M*n image data of the h−1-th row of the first storage block are outputted according to the above process.

A reading order of the storage block and a horizontal group is determined by reading a first group to a v-th group or the v-th group to the first group, a first row to an h-th row reading or the h-th row to the first row reading according to requirements of the LED driver chip and the arrangement order of a three-component RGB, and the reading order in the above embodiment is merely one example.

Further, the image group has a preset spatial capacity, and calculating the preset spatial capacity according to a following formula: $P \geq m*3*n*B$(bit), where P is the preset spatial capacity, m is the number of the image blocks divided by the box, n is the number of driver chips used for each color channel in each image blocks, and number 3 is characterized as the three-component RGB.

The off-chip memory opens up with v block spaces to form v storage blocks, where each block space is divided into h rows, continuous address spaces on the off-chip memory are used in intra-group, and each image group needs to satisfy the requirements of the present spatial capacity, as illustrated in FIG. 4.

Further, the method further includes the following step.

In step S122, the image data from the source end is read in a ping-pong mode through the two rows of the buffers in the on-chip memory and written into the v storage blocks of the off-chip memory.

In other words, in implementation, the obtained each row of image data is alternately stored into the two buffers.

Further, the step S122 may be achieved by following steps and includes steps described below.

Storing the image data in each row of the M image blocks is implemented in the following manner.

An f-th row of image data in an e row of the M image blocks is read, and the f-th row of image data is stored in an a-th row of the buffers in order from left to right.

The f-th row of image data stored in a b-th row of the buffers is stored in the v storage blocks, where $1 \leq e \leq N$, $1 \leq f \leq v$, and a=1, b=2 or a=2, b=1.

Figure 5:
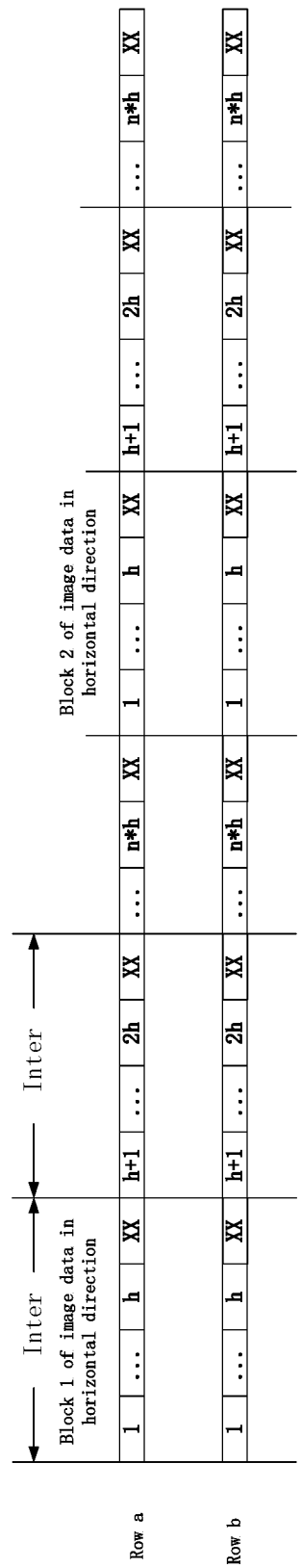
FIG. 5 is a schematic diagram illustrating the method according to which the image data is stored in a buffer according to the present disclosure.

The two rows of buffers are provided in a main control chip to alternately store each row of data sent by the source end, as illustrated in FIG. 5, where h is the data channels opened by each LED driver chip, and n represents the number of driver chips used by each color channel of each image block. The number of folds in the horizontal direction of the box is not fixed, and 2-folds image block illustrated in FIG. 5 are an example.

Here, the two rows of buffers in the on-chip memory operate simultaneously. When the one row of buffers reads the second row of image data of the first row of image blocks, in the other row of buffers, the first row of image data of the first row of image blocks is stored in the first storage block at the same time until all the v rows of image data of the first row of image blocks are read and written into the v storage blocks, and then the read-write of the second row of image blocks are started to perform. The process is the same as that of the above embodiment and will not be repeated here.

Further, the buffer includes at least one storage interval, and the storage interval is calculated according to the following formula: $Inter=2^i \geq h$, where Inter is the storage interval, i is a minimum value that makes Inter greater than or equal to h, and h is the number of the v rows of image data included in the each of the h image groups.

Further, reading an f-th row of image data in an e row of the M image blocks, and storing the f-th row of image data in an a-th row of the buffers in order from left to right may be achieved by the following steps, and including steps described below.

Step one, a g-th group of image data in the f-th row in the e-th row of the M image blocks is read.

Step two, when the storage interval is not equal to 2i, a starting address of the (g+1)-th group of image data is strode over 2i-h image data addresses and then stored in an a-th row of the buffers, where $1 \leq g \leq (n-1)$.

Here, when h is not equal to 2i, a starting address of next segment data is strode over 2i-h pixel addresses and XX illustrated in FIG. 5 is the skipped space.

Figure 6:
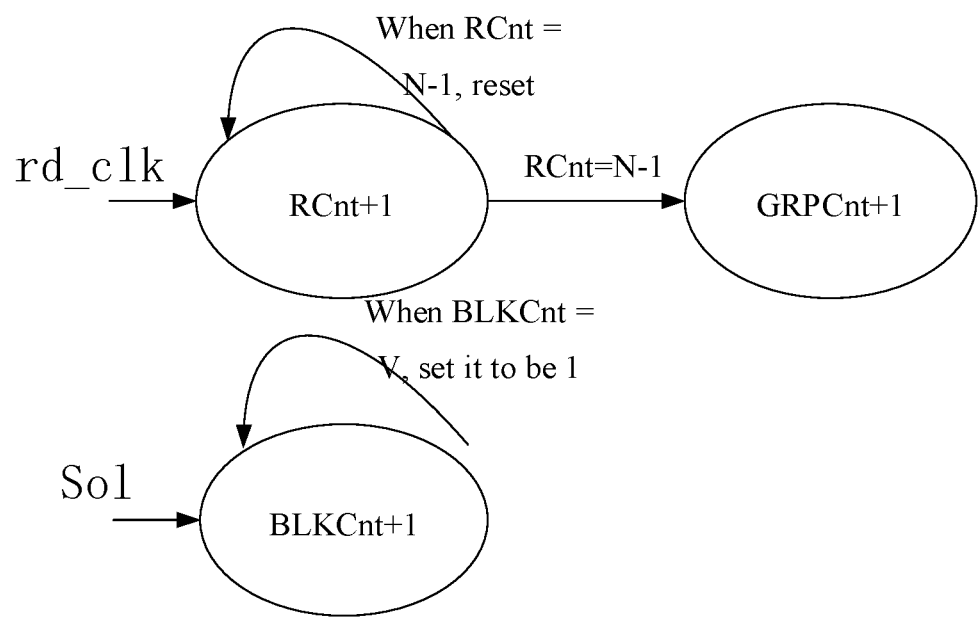
FIG. 6 is a schematic diagram illustrating the counting of each counter according to the present disclosure.

As illustrated in FIG. 6, a counter RCnt represents a reading clock counter, GRPCnt represents an LED data channel counter, and BLKCnt represents a row scan counter. The number of LED chips used in the horizontal direction of the box is set to be N, and the number of row scans of each image block is set to be V. Loop count from 0 to (N−1) is performed on RCnt. Loop count from 0 to (Inter−1) is performed on GRPCnt. Loop count from 1 to V is performed on BLKCnt. Each count condition is shown in FIG. 6. rd_clk represents a reading clock for an on-chip row buffer, and Sol represents a row mark for each row. A reset processing is performed on the RCnt and GRPCnt for each row, and a presetting 1 processing is performed on the BLKCnt for each frame.

At each time, a reading address rd_addr of the row buffer is equal to {RCnt, GRPCnt}, and when Rcnt=(N−1) and GRPCnt=(Inter−1), the current row reading ends. Whenever Rcnt=(N−1), the read N pixel data is written into a BLKCnt-th block and a (GRPCnt+1)-th group of the off-chip memory in a burst mode, and a writing starting place in intra-group is m*3*n*B (bit address), as illustrated in FIG. 7.

Figure 9:
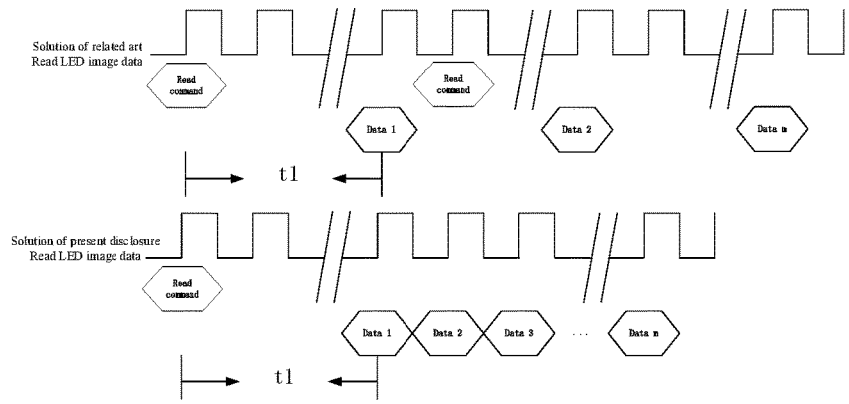
FIG. 9 is a schematic diagram illustrating the comparison of efficiency of image data reading methods according to the present disclosure.

FIG. 9 is a schematic diagram illustrating the comparison of efficiency of image data reading methods according to the present disclosure.

Where t1 represents interval time between the initiation of the read command originated to the read return data. The related art solution has t1 time overhead when each LED pixel data is read. In the present disclosure, one burst read has merely one t1 time overhead, and if the maximum burst read supported by the external memory is used, the reading time can be saved as much as possible.

Figure 10:
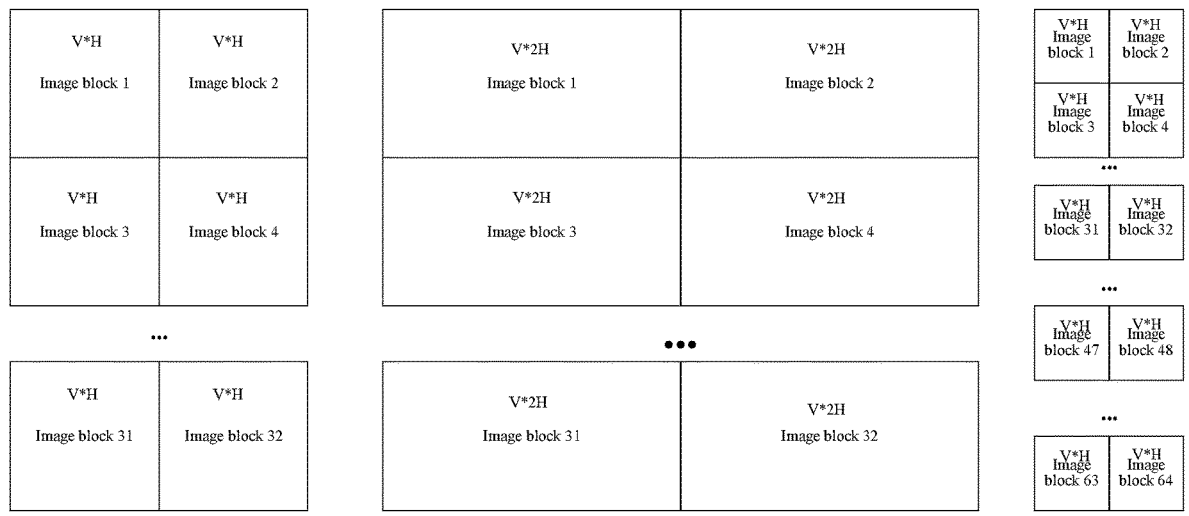
FIG. 10 is a schematic diagram illustrating the comparison of boxes with different resolutions according to the present disclosure.
Figure 11:
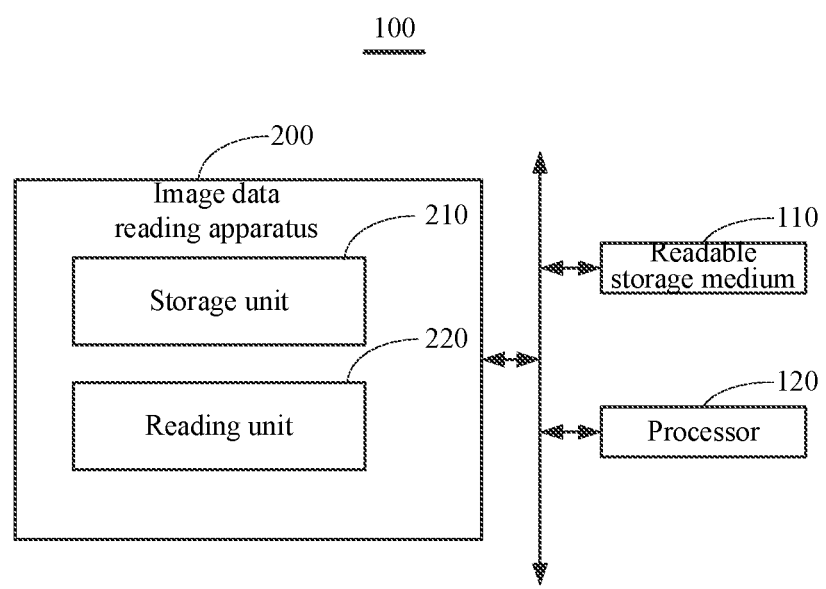
FIG. 11 is a block diagram illustrating an electronic device configured to perform the above-described image data reading method according to the present disclosure.

The number of data arrays is set to be m, LED driver chip data clock DCLK is set to be f, and the resolution size of each image block is set to be V*H, as illustrated in FIG. 10, data bit width of each channel is set to be N, and the image frame rate is set to be F, then f>V*H*N*F.

An instantaneous bandwidth BW of the data transmitted by the LED driver chip is equal to 3*m*f*, when m=32 and f=9.6 MHz, BW=0.92 Gbps, i.e. the instantaneous bandwidth for reading LED data needs to be greater than 0.92 Gbps.

The reading efficiency of the related art solution is relatively low, when the reading efficiency is at 10% to 40%, if the effective bandwidth reaches 0.92 Gbps, and the physical bandwidth of the external memory corresponds to 2.3 Gbps to 9.2 Gbps. According to the image data reading method provided in the present disclosure, the reading efficiency for an image may reach 70% to 90%, the physical bandwidth of an external memory corresponds to 1.0 Gbps to 1.3 Gbps.

As illustrated in FIG. 10, if the horizontal resolution of the left original box is increased to 2*H (the total pixels of each image block are doubled, and f needs to be doubled accordingly), i.e. it becomes the middle horizontal enlarged box, the vertical resolution remains unchanged, and then BW=3*32*9.6M*2=1.84 Gbps. The bandwidth requirements for external memory of the two solutions are 4.6 Gbps to 18.4 Gbps and 2.0 Gbps to 2.6 Gbps, respectively.

If the horizontal resolution of the box remains unchanged, the vertical resolution of the left original box is increased to 2*V (the data array needs to be doubled), i.e. it becomes the middle horizontal enlarged box, and then BW=3*64*9.6M*2=1.84 Gbps. The bandwidth requirements for external memory of the two solutions are 4.6 Gbps to 18.4 Gbps and 2.0 Gbps to 2.6 Gbps, respectively.

So that requirement on the bandwidth of the external memory of the present disclosure can be lower, and the box receiving card with multi-data array and large resolution can be supported by the main control chip with low performance and the external memory. The main control chip includes an Field Programmable Gate Array (FPGA).

FIG. 10 is a schematic diagram illustrating an electronic device 100 for implementing the image analysis method according to the present disclosure. In this embodiment, the electronic device 100 may be, but is not limited to, a personal computer (PC), a notebook computer, a monitoring device, a server and other computer devices having reading image data and processing capabilities.

The electronic device 100 includes an image data reading apparatus 200, a readable storage medium 110 and a processor 120. In the present disclosure, the image data reading apparatus 200 includes at least one software function module that can be stored in the storage medium 110 in the form of software or firmware, or fixed in an operating system (OS) of the electronic device 100. The processor 120 is configured to execute executable software modules stored in the readable storage medium 110, for example, software function modules and computer programs are included in the image data reading apparatus 200. In this embodiment, the image data reading apparatus 200 may be integrated into the operating system as a part of the operating system. Specifically, the image data reading apparatus 200 includes a storage unit 210 and a reading unit 220.

The storage unit 210 is configured to store image data in each row of image blocks into a number of v storage blocks, and each of the v storage blocks stores a number of h rows, where each row of data includes image data at a same position of every group in the same row of every image block.

In the present disclosure, the storage unit 210 is specifically configured to receive an image frame, where the image frame includes a plurality of image blocks, each of the plurality of image blocks includes v rows of image data, each row of the v rows of the image data is divided into a plurality of data arrays, and each of the plurality of data arrays includes h pixel data; and for each of the plurality of image blocks included in the image frame, write pixel data at a j-th position of every of the plurality of data arrays in an i-th row of every of the plurality of image blocks into a j-th data array of an i-th storage space, where $1 \le i \le v$, $1 \le j \le h$.

The reading unit 220 is configured to sequentially perform output from the each of v storage blocks in the following manner: sequentially reading each row of the image data in a vertical order, and simultaneously outputting the image data at the same position.

It can be understood that the specific operation method of each function module in the embodiment may refer to the detailed description of the corresponding steps in the above method embodiments, and will not be repeated in the embodiment.

In conclusion, the present disclosure provides an image data reading method and apparatus, an electronic device and a readable storage medium, where the image data reading method includes storing image data in each row of image blocks into a number of v storage blocks, each of the v storage blocks storing a number of h rows, and each row of data including image data at a same position of every group in the same row of every image block; and sequentially performing output from each of v storage blocks by: sequentially reading each row of the image data in a vertical order, and simultaneously outputting the image data at the same position. Without changing the hardware read-write clock frequency or increasing the bit width, the time required for reading image data in an off-chip memory by an LED driver chip is shortened by adopting a burst read mode.

It is to be understood that the devices and the methods disclosed in the embodiments of the present disclosure may be implemented in other manners. The preceding apparatus embodiments are merely illustrative. For example, the flowcharts and block diagrams in the drawings illustrate possible implementation of architectures, functions and operations of systems, methods and computer program products according to a plurality of embodiments of the present disclosure. In this regard, each block in a flowchart or block diagram may represent a module, a program segment, or part of codes that contains one or more executable instructions for implementing specified logical functions. It is to be noted that, in some alternative embodiments, the functions noted in the blocks may take an order different than noted in the drawings. For example, two sequential blocks may, in fact, be executed substantially concurrently, or sometimes executed in the reverse order, which depends on the involved functions. It is to be noted that each block of the block diagrams and/or flowcharts, and combinations of blocks in the block diagrams and/or flowcharts may be implemented by not only specific-purpose hardware-based systems that perform specified functions or actions, but also combinations of specific-purpose hardware and computer instructions.

Additionally, functional modules in the embodiments of the present disclosure may be integrated together to form an independent part, or each module may exist alone, or two or more modules may be integrated to form an independent part. It is to be noted that as used herein, term "comprise", "include" or any other variant thereof is intended to encompass a non-exclusive inclusion so that a process, method, article or device that includes a series of elements not only includes the expressly listed elements but also includes other elements that are not expressly listed or are inherent to such a process, method, article or device. In the absence of more restrictions, the elements defined by the statement "including a . . . " do not exclude the presence of additional identical elements in the process, method, article or device that includes the elements.

It will be apparent to those skilled in the art that the present disclosure is not limited to the details of the above exemplary embodiments, and that the present disclosure can be embodied in other forms without departing from the spirit or essential features of the present disclosure. Thus, embodiments of the present disclosure are illustrative and not restrictive. The scope of the present disclosure is defined by the appended claims rather than by the foregoing description and is therefore intended to cover all changes that fall within the meaning and scope of an equivalency of the claims. Reference numbers in the claims are not to be construed as limiting the claims.

INDUSTRIAL APPLICABILITY

The present disclosure provides an image data reading method and apparatus, an electronic device and a readable storage medium to shorten the time required for reading image data in an off-chip memory by an LED driver chip without changing the hardware read-write clock frequency or increasing the bit width by adopting a burst read mode.

What is claimed is:

1. An image data reading method, applied to an electronic device, the electronic device comprising an off-chip memory configured with a number of v storage blocks, wherein each of the v storage blocks is divided into a number of h groups, the image data reading method comprising:
storing image data in each row of image blocks into the v storage blocks, each of the v storage blocks comprising a number of h rows, each row of the h rows of data comprising image data at a same position of every group in the same row of every image block; and
sequentially performing output from each of the v storage blocks, by:
sequentially reading each row of the image data in a vertical order, and simultaneously outputting the image data at the same position.

2. The image data reading method of claim 1, wherein "storing image data in each row of image blocks into a number of v storage blocks, each of the v storage blocks storing a number of h rows, each row of the h rows of data comprising image data at a same position of every group in the same row of every image block" comprises:
receiving an image frame, which comprises a plurality of image blocks, each of the plurality of image blocks comprising a number of v rows of image data, each row of the v rows of image data being divided into a plurality of data arrays, each of the plurality of data arrays comprising a number of h pixel data; and
for each of the plurality of image blocks comprised in the image frame, writing pixel data at a j-th position of every of the plurality of data arrays in an i-th row of every of the plurality of image blocks into a j-th data array of an i-th storage block, wherein $1 \leq i \leq v$, $1 \leq j \leq h$.

3. The image data reading method of claim 2, wherein the electronic device comprises a plurality of LED lamps arranged in an array and configured to be driven by a number of N LED driver chips to display the received image frame, each of the N LED driver chips being operative to drive LED lamps in a number of v rows and h columns; and
wherein the image frame comprises a number of M image blocks, each row of the image data in each of the M image blocks being divided into a number of N data arrays, wherein each color channel of pixels in the image frame has a number of B data bits, and a space size of each of the N data arrays reaches at least $M*N*3B$ bits.

4. The image data reading method of claim 2, wherein the electronic device comprises an on-chip memory provided with a buffer, and wherein "for each of the plurality of image blocks comprised in the image frame, writing pixel data at a j-th position of every of the plurality of data arrays in an i-th row of every of the M image blocks into a j-th data array of an i-th storage block" comprises:
obtaining an i-th row of image data of the image frame in the order from top to bottom, and storing the obtained i-th row of image data into the buffer; and
for the plurality of data arrays of the i-th image data, sequentially reading the pixel data at a j-th position of every of the N data arrays to obtain a number of N pixel data, and writing the N pixel data into the j-th data array of the i-th storage block.

5. The image data reading method of claim 4, wherein the electronic device is provided with a clock counter RCnt and a data channel counter GRPCnt, and wherein "for the plurality of data arrays of the i-th row of image data, sequentially reading the pixel data at a j-th position of every of the N data arrays to obtain a number of N pixel data, and writing the N pixel data into the j-th data array of the i-th storage block" comprises:
in response to starting to read the i-th row of image data from the buffer, resetting the clock counter RCnt and the data channel counter GRPCnt;
cyclically counting the clock counter RCnt, and reading pixel data of a (GRPCnt+1)-th position in a (RCnt+1)-th data array of the i-th row of image data at each count; and
in response to a value of the clock counter RCnt reaching (N−1), counting the data channel counter GRPCnt, and writing the number of N pixel data that is currently read into a (GRPCnt+1)th group of the i-th storage block in a burst mode.

6. The image data reading method of claim 5, wherein the electronic device assigns a corresponding storage interval Inter for each of the h groups, and the storage interval Inter is operative to store the pixels of at least one of the N data arrays;

wherein "for each of the plurality of image blocks comprised in the image frame, writing the pixel data at a j-th position of every of the plurality of data arrays in an i-th row of every of the plurality of image blocks into a j-th data array of an i-th storage block" further comprises:

in response to the value of the clock counter RCnt reaching (N−1), and a value of the data channel counter GRPCnt reaching (Inter−1), determining that reading of the i-th row of image data is completed, and starting to read a next row of image data of the image frame from the buffer.

7. The image data reading method of claim 4, wherein the on-chip memory is provided with two buffers, and wherein "obtaining an i-th row of image data of the image frame in the order from top to bottom, and storing the obtained i-th row of the image data into the buffer" comprises:

storing the obtained each row of the image data alternately into the two buffers.

8. The image data reading method of claim 2, wherein "sequentially reading each row of image data in a vertical order, and simultaneously outputting the image data at the same position" comprises:

after writing the image frame into the off-chip memory, sequentially reading each row of image data in the vertical order and simultaneously outputting the image data at the same position.

9. The image data reading method of claim 8, wherein "sequentially reading each row of image data in a vertical order, and simultaneously outputting the image data at the same position" comprises:

sequentially reading the image data of the image frame stored in each of the v storage blocks by a serial number of each of the v storage blocks in a burst mode, wherein for each of the v storage blocks, reading pixel data in each of the N data arrays in reverse order according to a serial number of each of the N data arrays.

10. The image data reading method of claim 1, wherein the image data reading method is applied to a box divided into a number of M image blocks, wherein the M image blocks is arranged into a number of N rows, each of the M image blocks comprising a number of v rows of image data, each row of the v rows of image data is divided into a number of n groups, and each of n groups comprising a number of h image data, and wherein "storing image data in each row of image blocks into a number of v storage blocks, each of the v storage blocks storing a number of h rows, each row of the h rows of data comprising image data at a same position of every group in the same row of every image block" comprises:

storing image data in each row of image blocks by:
sequentially extracting in order from left to right an i-th image data of each of n groups from a j-th row of image data stored in a buffer, thus generating a number of h image groups, and sequentially arranging the h image groups in a vertical order according to the order they are generated to obtain a j-th arrangement group, and storing the j-th arrangement group in a j-th storage block, wherein each of the h image groups comprises a number of M*n/N image data, 1≤j≤v, 1≤i≤h; and wherein an off-chip memory comprises a number of v storage blocks, each of the v storage blocks comprising a number of h rows, and wherein in each of the v storage blocks, a j-th arrangement group corresponding to a j-th row of image data of a k-th row image block is adjacent to a j-th arrangement group corresponding to a j-th row of image data of a (k+1)-th row of image block, where 1≤k≤(N−1).

11. The image data reading method of claim 10, further comprising reading the image data from a source end through two rows of the buffers in an on-chip memory in a ping-pong mode, and writing the image data into the storage blocks of the off-chip memory.

12. The image data reading method of claim 11, wherein "reading the image data from a source end through two rows of the buffers in an on-chip memory in a ping-pong mode, and writing the image data into the storage blocks of the off-chip memory" comprises:

storing image data in each row of the image blocks by:
reading an f-th row of image data in an e-th row of the M image blocks, and storing the f-th row of image data in an a-th row of the buffers in of the order from left to right; and storing the f-th row of image data stored in a b-th row of the buffers into the v storage blocks, where 1≤e≤N, 1≤f≤v, and a=1, b=2 or a=2, b=1.

13. The image data reading method of claim 12, wherein each of the rows of the buffers comprises at least one storage interval, which is calculated according to the following formula:

$$\text{Inter}=2^i \geq h;$$

wherein Inter is the storage interval, i is a minimum value that makes Inter greater than or equal to h, and h is a number of image data comprised in each of the h image groups.

14. The image data reading method of claim 13, wherein "reading an f-th row of image data in an e-th row of the M image blocks, and storing the f-th row of image data in an a-th row of the buffers in of the order from left to right" comprises:

reading a g-th group of image data in the f-th row of the e-th row of the image blocks; and when the storage interval is not equal to $2^i$, striding a starting address of the (g+1)-th group of image data over a number of $2^i$−h image data addresses, and then storing into an a-th row of the buffers, wherein 1≤g≤n−1.

15. The image data reading method of claim 10, wherein each of the h image groups has a preset spatial capacity, which is calculated according to the following formula:

$$P \geq m*3*n*B(\text{bit});$$

wherein P is the preset spatial capacity, m is the number of the image blocks into which the box is divided, and n is a number of driver chips used for each color channel in each of the m image blocks.

16. A non-transitory readable storage medium, storing a computer program, which when executed causes the image data reading method of claim 1 to be performed.

17. An electronic device, comprising:
a readable storage medium;
a processor; and
an image data reading apparatus stored in the readable storage medium and comprising software function modules executed by the processor, the software function modules comprising a storage unit and a reading unit, wherein the image data reading apparatus is configured to execute the software function modules to:
call the storage unit to store image data in each row of image blocks into a number of v storage blocks, wherein each of the v storage blocks stores a number of h rows, each row of data comprising image data stored at a same position of every group in the same row of every image block; and call the reading unit to sequentially perform output from each of v storage blocks by: sequentially reading each row of image data in a vertical order, and simultaneously outputting the image data at the same position.

\* \* \* \* \*